B. P. FALTIN.
MECHANICAL MEASURE.
APPLICATION FILED MAR. 1, 1921.
1,408,282.
Patented Feb. 28, 1922.
3 SHEETS—SHEET 1.
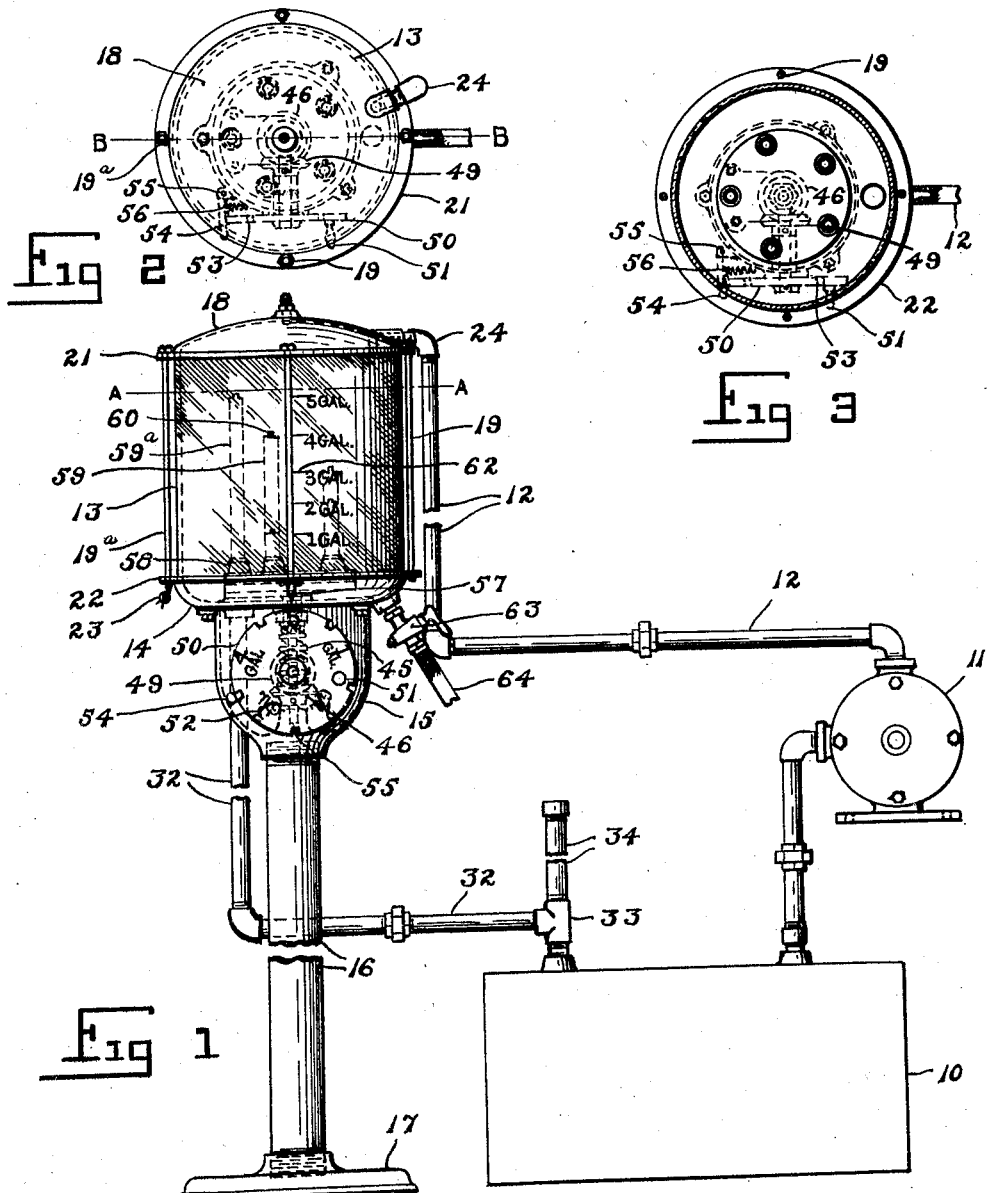
Bernard P. Faltin.
INVENTOR.
BY Victor J. Evans
ATTORNEY.

B. P. FALTIN.
MECHANICAL MEASURE.
APPLICATION FILED MAR. 1, 1921.
1,408,282.
Patented Feb. 28, 1922.
3 SHEETS—SHEET 2.
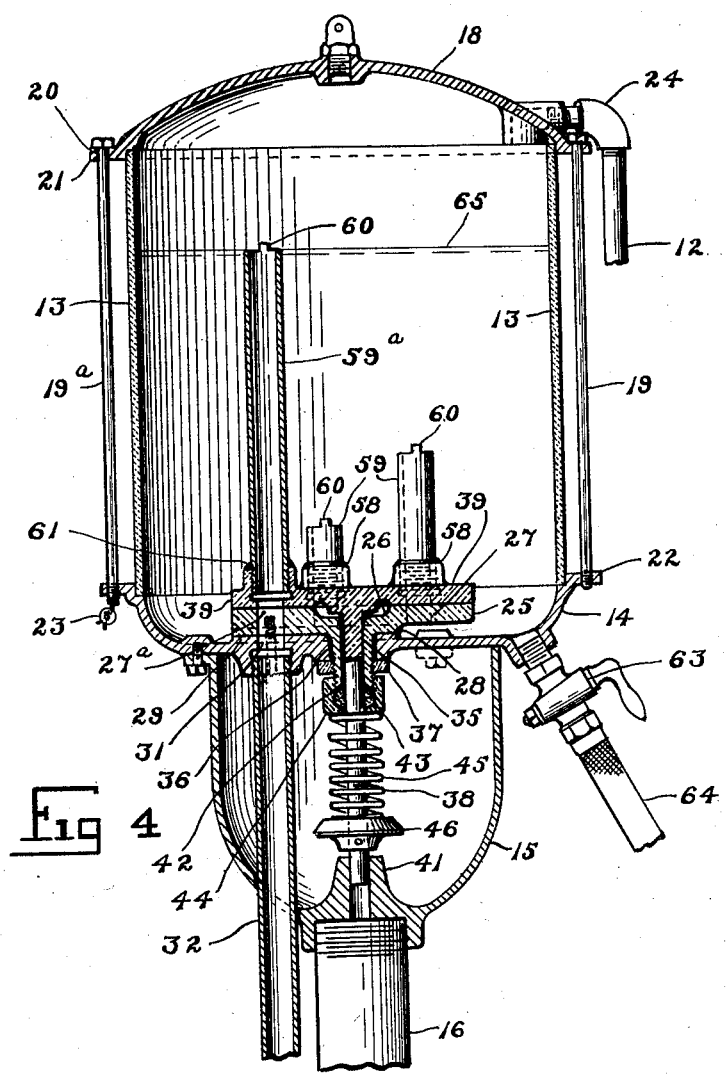
Bernard P. Faltin
INVENTOR.
BY Victor J. Evans
ATTORNEY.

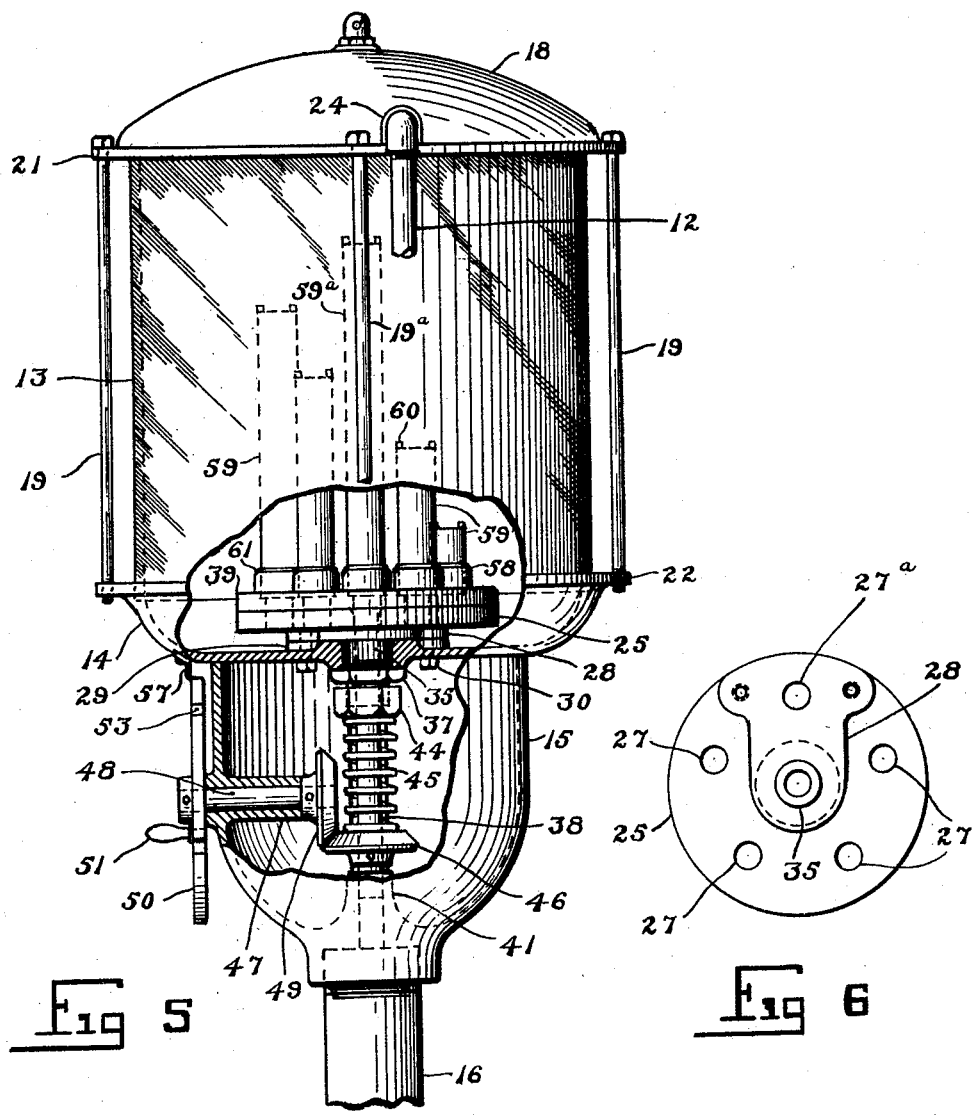

UNITED STATES PATENT OFFICE.

BERNARD P. FALTIN, OF PHILADELPHIA, PENNSYLVANIA.

MECHANICAL MEASURE.

1,408,282.  Specification of Letters Patent.  Patented Feb. 28, 1922.

Application filed March 1, 1921. Serial No. 448,760.

*To all whom it may concern:*

Be it known that I, BERNARD P. FALTIN, a citizen of the United States, residing at Philadelphia, in the county of Philadelphia and State of Pennsylvania, have invented new and useful Improvements in Mechanical Measures, of which the following is a specification.

This invention relates to measuring devices and more particularly to devices for dispensing predetermined quantities of fluids, and it has for its primary object to provide a mechanical measure for measuring hydrocarbonaceous liquids such as gasoline and the like.

Another object of my invention is to provide a mechanical measure which is "foolproof" and cannot be illicitly used or tampered with without instant detection.

A further object is to furnish a mechanical measure which—when once accurately adjusted—is reliable and nonwasteful in use, durable and cannot easily get out of order, and furthermore, automatically and quickly measures out the required quantity of fluid desired.

A still further object of the invention is the provision of a mechanical measure which can be cheaply manufactured and easily installed where required.

With the foregoing and other objects in view as will be more apparent as this description proceeds, my invention consists essentially in the novel features of construction, combination and arrangement of parts hereafter fully described, and more specifically defined by the appended claims.

In the further disclosure of the invention reference is to be had to the accompanying sheets of drawings constituting a part of this specification and in which like characters of reference designate the same or corresponding parts in all the views.

Figure 1— is an elevation of my improved mechanical measure and associated parts.

Figure 2— is a top plan of the mechanical measure.

Figure 3— is a sectional plan of the same taken approximately on the line A—A in Figure 1.

Figure 4— is an enlarged central vertical section through the measuring chamber and taken on the line B—B in Figure 2.

Figure 5— is an elevation of the mechanical measure proper with part broken away to better illustrate the underlying structure; and Figure 6— is an underside plan of a valve member hereinafter more particularly referred to.

Referring more specifically to the drawings the numeral 10 designates a storage tank such as is provided at service stations for the containing of a large quantity of gasoline which is adapted to be pumped therefrom by an appropriate pump 11 under suitable control and forced through a pipe connection 12 into the tank or container 13 of my improved mechanical measure. The tank or container 13 is conveniently made of glass or other suitable transparent material cylindric in cross section and it is seated at its lower part liquid proof in a dished base 14 beneath which is securely mounted a housing 15 supported on the upper end of a standard 16 provided with a heavy base or foot-piece 17 which may be secured to the floor in any of the well known ways—such for example as by holding down bolts—not shown. A removable cap or cover 18 is fitted to the top of the tank or container 13 and is securely clamped thereon by means of screw bolts 19 passed through holes 20 in the flange 21 and threaded into a corresponding flange 22 about the upper edge of the aforesaid dished base 14, one of said bolts 19ª being extended therethrough and transversely holed for the accommodation of a sealing means 23 whereby the device is secured against illicit use and fraudulent tampering with. An appropriate air vent is fitted in the crown of the cover or cap 18, whilst the aforesaid pipe connection 12 is coupled thereto by means of an elbow 24.

The measuring mechanism proper consists of a lower or fixed member or plate 25 which is centrally recessed or dished at 26 on its upper face and provided with a series of equally spaced apertures or holes 27, 27ª, whilst the underside thereof is formed with a boss 28 for seating on a correspondingly shaped boss 29 in the aforesaid dished base 14, studs 30 serving to clamp said parts securely together. It is to be here particularly noted that the hole 27ª registers with a hole 31 in the dished base 14 and beneath which is fitted the overflow or return pipe 32 connecting with the storage tank 10 by means of a T-connection 33 having a capped branch 34 serving for filling purposes as will be readily understood by those acquainted with the art to which this invention appertains. Depending centrally from the aforesaid fixed member or plate 25 is a slightly tapered tubular part or shank 35 for passage through a correspondingly shaped hole 36 in the dished base 14 and it is externally threaded to receive a nut 37 to ensure a friction fit and liquid-proof joint between the parts 25 and 14.

Rotatably mounted on the fixed member or plate 25 by means of a vertical shaft 38 passing through the tubular part 35 is a valve plate 39 having holes or aperatures 40 therethrough corresponding to and adapted for consequential registration with the holes 27, 27a in the fixed member 25, said vertical shaft 38 extending downwards sufficient to journal in an upwardly projecting boss 41 provided for its reception in the lower part of the housing 15. In order to provide means for insuring a liquid proof joint between the shaft 38 and the tubular part or shank 35 I preferably fashion the lower end of the latter somewhat cupped at 42 to seat an appropriate packing 43 which is held in place by means of a gland nut 44 threaded on to the aforesaid tubular part or shank 35 as will be clearly understood on an examination more particularly of Figure 4. Furthermore, it is to be observed that I interpose a compression spring 45 between the gland nut 44 and a miter gear 46 keyed or otherwise secured on the shaft 38 whereby the valve plate 39 is kept seated snugly on the fixed member 25 and thus preventing any leakage thereat.

Laterally projecting internally of the housing 15 is a bearing sleeve 47 in which is journaled a shaft 48 having attached at its inner end a miter gear 49 in mesh with the aforesaid gear 46 on the vertical shaft 38, and mounted on the outer end of said shaft 48 is a disc 50 provided with a handle or knob 51 by means of which the shaft 48 may be rotated as hereafter explained, and this disc 50 is provided on its frontal surface with appropriate markings or gradations 52 serving to designate for example liquid measures reading from one to five gallons. In order to provide a means for locking the disc 50 at the requisite reading I preferably form notches 53 in its peripheral edge with which co-operate a latch member 54 pivoted on the housing 13 at 55 and under the action of a recoil spring 56, whilst a pointer 57 of appropriate nature is secured to the flange 22 for registration with the required quantity reading on the disc 50 as later on explained.

Formed integrally with, and on the upper surface of the valve plate 39 are a series of internally threaded bosses 58 concentric with the holes or apertures 40 therein, said bosses 58 receiving the correspondingly threaded lower ends of measuring tubes 59 the upper ends whereof are provided with projections or upstanding ears 60 by means of which they may be accurately adjusted and subsequently locked by a joint of solder 61; or lock nuts may be fitted over or on the bosses 58 as will be clearly comprehended by those skilled in the art.

An appropriate graduated scale or liquid measure indicator 62 may be attached to or is preferably arranged inside the tank or container 13 for giving a visible reading of the quantity of liquid to be run off or sold. In some instances I may fit to the upper ends of the measuring tubes 59 adjustable caps adapted to be locked in appropriate manner after accurate regulation to the required height for measuring of determined quantities. Similarly the graduated scale 62 may be made adjustable so that absolute precision is ensured in the quantity measured off.

An appropriate cock or valve 63 is fitted into the bottom of the housing 13 and has the usual flexible delivery pipe 64, by means of which the required number of gallons or the like of gasoline is drawn off through the mechanical measure and poured direct into the vehicle tank or otherwise disposed of.

Having outlined the structural features of my improved mechanical measure I will now outline its use and operation; and assuming that the tank 10 contains gasoline and that an automobile requires five gallons the service station operator or employee releases and holds the catch member 54 from engagement with the notches 53 and turns the disc 50 by the handle 51 until the five-gallon reading or graduation 52 thereon aligns with the pointer 57 whereupon said catch member 54 is released and engages with the registering notch 53 thus locking the disc against further rotation. The pump 11 is thereupon set in operation in any of the well known ways to fill the tank or container 13, and it is to be here particularly observed that the aforesaid rotation of the disc 50 results in the turning of the valve plate 39 through the gears 49, 46, and shaft 38 and the bringing of the five gallon measuring tube 59a into registration over the hole 31 in the fixed member or plate 25 and return or overflow pipe 32. Thus it will be readily seen that the tank or container 13 fills up to the top or level of the upper end of the measuring tube 59a—as indicated by the numeral 65 in Figure 4.

Any surplus will flow through said tube 59a and be returned by the pipe 32 to the storage tank 10. When the level 65 is attained indicating that the tank or container 13 holds an accurate five gallons the operator turns or opens the valve or cock 63 thereby allowing the measured quantity of gasoline to be drained-off through the pipe 64 to the vehicle storage tank, it being most particularly observed that the other measuring tubes 59 will be in registration with the holes 27 in the fixed member 25 whereby the liquid therein is also drained away, and said tank or container 13 properly emptied. Another feature to be noted is the disposition of the fixed member or plate 25 in what may be termed spaced relation relative to the bottom of the tank or container 13 due to the bosses 28, 29, whereby all liquid in said container and the measuring tubes 59 is properly drained away after each usage of my improved mechanical measure, a fact on which I lay great stress as it ensures the purchaser receiving full and correct measure. Obviously the clearly depicted liquid measure scale 62 ensures the purchaser against fraud on the part of the service station as due to its location on or within the transparent tank or container 13 any attempt at short measure could be clearly seen. Still further the sealing of the device by the seal 23 when once accurately adjusted further protects the purchaser as any damage to or tampering with said seal can be clearly seen.

From the foregoing description taken in conjunction with the accompanying drawings the measuring off of other quantities of liquid will be clearly comprehended, and it will also be seen that by my invention I have provided an extremely simple construction of mechanical measure which will be highly efficient in operation and possess advantages over devices of analogous nature heretofore used for the same or similar purposes. One point or feature on which I desire to lay particular emphasis is the manner of draining the measuring tubes 59, 59ª, and tank or container 13 after each usage of the device whereby the purchaser of liquid measured by the device is protected against fraud, whilst it is also worthy of mention that by the particular arrangement and combination of parts shown and described a clear indication is ensured of the proposed purchase being seen at the time it is pumped from the storage tank 10. Another fact also to be remarked is that by arranging the bevel gear 46 below the miter gear 49 an effective means is provided for ensuring said gears being at all times in proper mesh and operative working connection.

Finally, I wish it clearly understood that whilst there has been shown and described the most practical form of the invention at present known to me, I hereby reserve the right to make all such detail changes and other embodiments thereof as reasonably fall within the scope of the appended claims.

Having described my invention what I claim as new and desire to secure by Letters Patent is:—

1. In a mechanical measure the combination with a storage tank and means for drawing a supply therefrom, of a tank having a dished base and sealable cover, a fixed member mounted within and in spaced relation to the dished base, said fixed member having openings therethrough and one of said openings registering with a return connection to the storage tank, a disc valve having upstanding measuring tubes of different heights and apertures thereunder adapted to be brought into individual alignment with the aforesaid return connection, means for rotating the disc valve and indicating the quantity of liquid to be measured, and a valve controlled discharge for the tank whereby the measured quantity is drawn off.

2. In a mechanical measure the combination with a storage tank and means for pumping a supply therefrom, of a transparent tank having a dished base and sealable cover, a fixed plate member mounted within and in spaced relation to the dished base, said fixed plate member having openings therethrough and one of said openings registering with a return drain connection to the storage tank, a disc valve having upstanding measuring tubes of different heights and apertures thereunder adapted to be brought into individual alignment with the aforesaid return connection, means for rotating the disc valve and indicating the quantity of liquid to be measured, and a valve controlled discharge for the tank whereby the measured quantity is drawn off.

3. In a mechanical measure the combination with a storage tank and means for pumping a supply therefrom, of a transparent tank having a dished base and sealable cover, a fixed plate member mounted within and in spaced relation to the dished base, said fixed plate member having openings therethrough and one of said openings registering with a return drain connection to the storage tank, a disc valve having upstanding measuring tubes of different heights and apertures thereunder adapted to be brought into individual alignment with the aforesaid return connection, means for rotating the disc valve and indicating the quantity of liquid to be measured, a visible indicating scale within the aforesaid tank, and a valve controlled discharge for tank for drawing off the quantity of liquid purchased.

4. In a mechanical measure the combination with a storage tank and means for pumping a quantity therefrom, of a transparent tank having a dished base and sealable cover, a fixed plate member mounted in spaced relation to and having a tubular shank for passage through the dished base, said fixed plate member having openings therethrough and one of said openings registering with a drain connection to the storage tank, an apertured disc valve having a depending shaft passing through the aforesaid tubular shank and upstanding measuring tubes of different heights over the apertures in the dished valve, means for adjusting and securing said measuring tubes in correctly adjusted position, means for rotating the disc valve and indicating the quantity of liquid to be measured, a visible indicating scale associated with the aforesaid tank, and a valve controlled discharge for the tank whereby the measured quantity is drawn off.

5. In a mechanical measure the combination with a storage tank and means for pumping a quantity therefrom, of a transparent tank having a dished base and sealable cover, a fixed plate member mounted in spaced relation to and having a tubular shank for passage through the dished base, said fixed plate member having openings therethrough and one of said openings registering with a drain connection to the storage tank, an apertured disc valve having a depending shaft passing through the aforesaid tubular shank and upstanding measuring tubes of different heights over the apertures in the disc valve, an adjustable packing on the lower end of the tubular shank, a miter gear on the depending shaft, a compression spring intervening the adjustable packing and miter gear for maintaining the apertured disc valve seated on the fixed plate member, means for rotating the depending shaft and indicating the quantity of liquid to be measured and a valve controlled discharge for the tank whereby the measured quantity is drawn off.

6. In a mechanical measure the combination with a storage tank and means for pumping a quantity therefrom, of a transparent tank having a dished base and sealable cover, a fixed plate member mounted in spaced relation to and having a tubular shank for passage though the dished base, said fixed plate member having openings therethrough and one of said openings registering with a drain connection to the storage tank, an apertured disc valve having a depending shaft passing through the aforesaid tubular shank and upstanding measuring tubes of different heights over the apertures in the disc valve, an adjustable packing on the lower end of the tubular shank, a miter gear on the depending shaft, a compression spring intervening the adjustable packing and miter gear for maintaining the apertured disc valve seated on the fixed plate member, a horizontal shaft journaled in a housing about the aforesaid depending shaft and having a gear in mesh with the miter gear thereon, a graduated disc on the outer end of the horizontal shaft and having peripheral notches, spring-influenced means for co-operation with the peripheral notches for locking the graduated disc at the required measure reading, a visible indicating scale within the aforesaid tank, and a valve controlled discharge for the tank whereby the measured quantity is drawn off.

7. In a mechanical measure including a tank for dispensing predetermined quantities, the combination of a fixed plate member mounted in spaced relation to and having a tubular shank for passage through the base of said tank, said fixed plate member having openings therethrough and one of which registers with an overflow connection, an apertured disc valve having a depending shaft for passage through the aforesaid tubular shank and upstanding measuring tubes of different heights over the apertures in the disc valve, means for adjusting and securing said measuring tubes in correctly adjusted position, spring-influenced means for retaining the apertured disc valve seated on the fixed plate member, and means for rotating the apertured disc valve and simultaneously indicating the quantity of liquid to be measured.

In testimony whereof I affix my signature.

BERNARD P. FALTIN.